United States Patent
Harada et al.

(10) Patent No.: US 6,778,172 B2
(45) Date of Patent: Aug. 17, 2004

(54) METHOD AND APPARATUS FOR EXTRACTING SURFACE FROM THREE-DIMENSIONAL SHAPE DATA AS WELL AS RECORDING MEDIUM

(75) Inventors: Koji Harada, Osaka (JP); Hitoshi Kamezawa, Osaka (JP); Yoshihisa Abe, Osaka (JP)

(73) Assignee: Minolta Co., Ltd., Osaka (JP)

( * ) Notice: Subject to any disclaimer, the term of this patent is extended or adjusted under 35 U.S.C. 154(b) by 275 days.

(21) Appl. No.: 09/932,936

(22) Filed: Aug. 21, 2001

(65) Prior Publication Data
US 2002/0030676 A1 Mar. 14, 2002

(30) Foreign Application Priority Data
Sep. 14, 2000 (JP) ........................................ 2000-279219

(51) Int. Cl.[7] .............................................. G06T 15/00
(52) U.S. Cl. ........................ 345/419; 345/423; 345/426
(58) Field of Search ................................ 345/419–423, 345/426

(56) References Cited

U.S. PATENT DOCUMENTS 5,623,583 A * 4/1997 Nishino ...................... 345/420
5,977,987 A * 11/1999 Duluk, Jr. ................... 345/441
6,249,600 B1 * 6/2001 Reed et al. .................. 382/154

FOREIGN PATENT DOCUMENTS

| JP | 8-221461 | 8/1996 |
| JP | 10-162167 | 6/1998 |
| JP | 11-147226 | 6/1999 |

* cited by examiner

Primary Examiner—Mark Zimmerman
Assistant Examiner—Adam Arnold
(74) Attorney, Agent, or Firm—Morrison & Foerster LLP (57) ABSTRACT

The apparatus sets a standard surface or a standard line with respect to three-dimensional shape data comprising polygons representing an object in a space where the three-dimensional shape data exist, extracts from the three-dimensional shape data polygons having inclination angles with respect to the set standard surface or the set standard line in a predetermined range, and set each collection of the extracted polygons as an extracted surface. Further, the apparatus displays each of the collection of extracted polygons as a surface on a display with putting a color or pattern to each of the collection of the polygons extracted correspondingly to one of the set inclination angles that is different from those of other collections of polygons.

14 Claims, 10 Drawing Sheets

METHOD AND APPARATUS FOR EXTRACTING SURFACE FROM THREE-DIMENSIONAL SHAPE DATA AS WELL AS RECORDING MEDIUM

This application is based on Japanese Patent Application No. 2000-279219 filed on Sep. 14, 2000, the contents of which are hereby incorporated by reference.

BACKGROUND OF THE INVENTION

1. Field of the Invention

The present invention relates to a method for extracting a surface from three-dimensional shape data, an apparatus for extracting a surface from three-dimensional shape data and a recording medium which stores a program for the same.

2. Description of the Prior Art

Conventionally, three-dimensional shape data of a component is used for examining its size and finish precision.

For example, there has been proposed an apparatus that can display three-dimensional shape image of a component on a display and calculate distances between a specific surface and a specific point designated by a user to display the calculation results. A problem detected with this method is that the surface appointed by the user is in fact a polygon comprised in the surface and, therefore, the distances calculated based on the polygon is variable depending on an angle of the polygon. A surface generally comprises a collection of polygons; however, orientations of the polygons are non-uniform.

Elements such as a surface, a cylinder and the like may be extracted from three-dimensional data of a component by comparing the three-dimensional data with CAD data of the same component. A side forming an outline of the component is then extracted based on the extracted elements. Distances between the extracted elements and the side are calculated, and the calculated values are compared with design values.

Various three-dimensional measurement devices of non-contact type or contact type may be used for obtaining three-dimensional shape data of a component.

In the above-described conventional method, CAD data of a component is used for extracting a surface and a side of the component. Accordingly, in the absence of the CAD data, user's workload is increased since the user has to manually extract the surface or the like by selecting an appropriate area of three-dimensional data by, for example, visual observation thereof.

In some cases, a user may need to know types of surfaces comprised in three-dimensional data, orientations of the surfaces and so on. In such cases, a normal line of each of polygons (polygon surfaces) that are comprised in the three-dimensional shape data is displayed as a segment or a vector.

Above method is suitable for detecting an orientation of a polygon; however, the method is insufficient for detecting an orientation and a condition of a surface as an outline of a component comprising a collection of polygons. Further, since information of all the polygon surfaces is displayed in the method, the method is time consuming for a user who desires to selectively obtain necessary information of the surfaces.

Japanese Unexamined Patent Publication No. 10-162167 discloses a method wherein plotted three-dimensional coordinates are displayed on a display as a rectangular parallelepiped, and xy surface, yz surface and zx surface are displayed with being put different colors or patterns. This method improves visibility in the visual direction; however, it is insufficient for detecting directions of every surfaces of an object.

Three-dimensional shape data subjected to modeling of a three-dimensional measurement device typically include noise caused by surface characteristics, colors of surfaces or a shape of an object. Especially, such noise is increased in the vicinity of an edge of the object, thereby making it difficult to grasp the shape of the object.

SUMMARY OF THE INVENTION

The present invention is accomplished by considering above problems. The invention enables to extract a surface of an object from three-dimensional shape data without using CAD data or the like. An object of the invention is to facilitate comprehension of not only the surface but also a shape of the object.

A method according to one aspect of the present invention comprises; setting a standard surface or a standard line with respect to three-dimensional shape data comprising polygons representing an object in a space where the three-dimensional shape data exist; extracting polygons each having an inclination angle in a predetermined range; and setting the polygons as an extracted surface.

An apparatus according to another aspect of the present invention comprises a setting portion for setting, with respect to three-dimensional data comprising polygons representing an object, a standard surface or a standard line in a space where the three-dimensional data exist; an angle setting portion for setting a range of inclination angles of polygons with respect to the standard surface or the standard line; an designating portion for designating an allowable range in the inclination angles; a calculating portion for calculating angles made by the polygons and the standard surface or the standard line; and an extracting portion for extracting polygons each having an inclination angle in the allowable range of the inclination angles. Here, each of the portions may be independent of each other and the two portions or more may be comprised of a common resource.

The apparatus further comprises a standard element calculating portion for detecting a standard element which is a surface or a line that is in a specific positional relationship with the standard surface or the polygons. A normal line may preferably be used as the line of the standard element. For example, it is judged whether or not an angle made by two normal lines is in the allowable range. Here, each of the portions may be independent of each other and the two portions or more may be comprised of a common resource.

The recording medium according to further aspect of the present invention records a program for letting a computer execute the processing of: setting a standard surface or a standard line with respect to three-dimensional shape data comprising polygons representing an object in a space where the three-dimensional shape data exist; extracting polygons each having an inclination angle with respect to the standard surface or a referenced line in a predetermined range; and designating a collection of the extracted polygons as an extracted surface.

DESCRIPTION OF THE PREFERRED EMBODIMENTS

Figure 1:
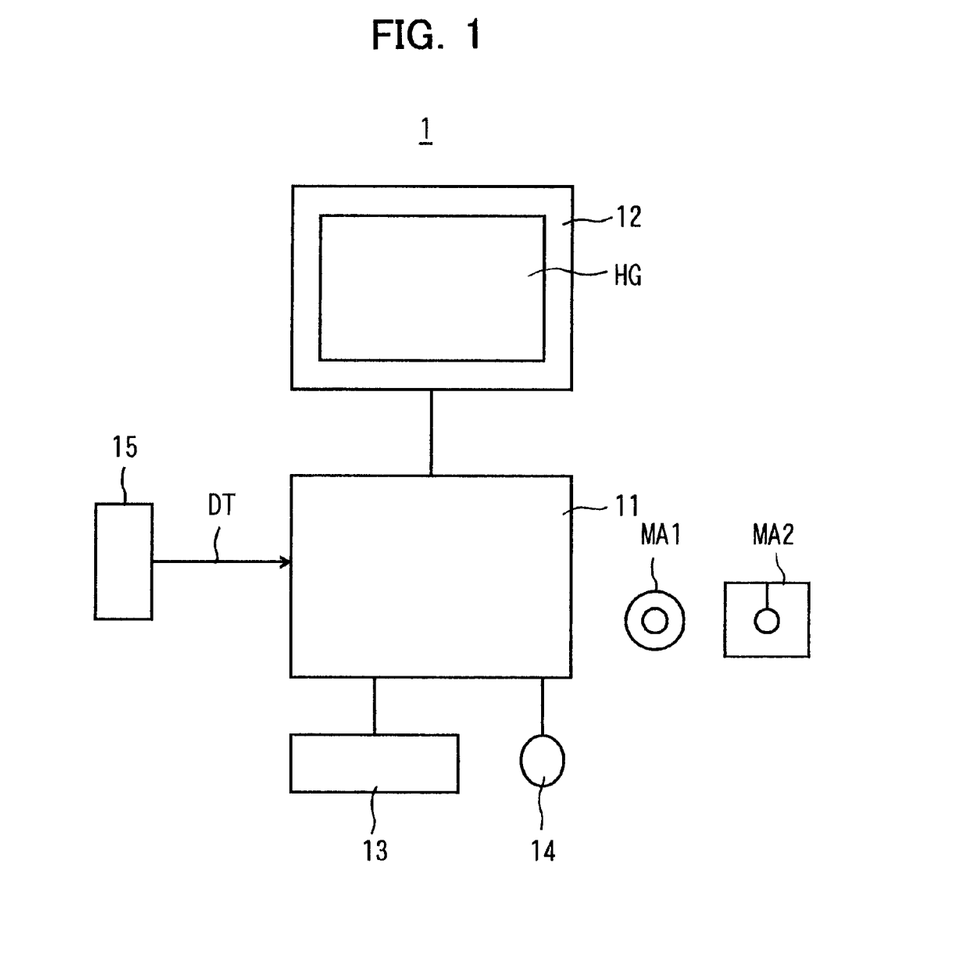
FIG. 1 is a block diagram showing a structure of a data processing apparatus according to an embodiment of the present invention.

FIG. 1 is a block diagram showing a structure of a data processing apparatus 1 according to an embodiment of the present invention.

Referring to FIG. 1, the data processing apparatus 1 is comprised of an apparatus body 11, a display 12, a keyboard 13, a mouse 14 and so on. The apparatus body 11 comprises a CPU, a ROM, a RAM, a magnetic disk device, a magneto-optical disk device, a CD-ROM drive, a floppy disk drive and so on. The CPU serves to execute programs memorized in the ROM or the RAM and realizes various functions to be described later in this specification. The programs are recorded in a recording medium MA such as a CD-ROM and a floppy disk and can be installed in the magnetic disc device to be loaded on the RAM when so required. It is also possible to download the programs from other servers via a network not shown.

On a display screen HG of the display device 12, there are displayed three-dimensional data DT that are input into the apparatus, three-dimensional shape data that are subjected to a predetermined processing in the apparatus body 11, other various data, images based on the data and so on.

The keyboard 13 and the mouse 14 are used when a user gives a command to or inputs data into the apparatus body 11.

The three-dimensional measurement device 15 obtains three dimensional shape data DT of an object Q by the non-contact type method such as the light-section method or the contact type method. The three-dimensional data DT output from the three-dimensional measurement device 15 are polygon data (polygon model) MR comprising polygons. In the case where distance data are output from the three-dimensional measurement device 15, the distance data are converted into the polygon data MR in the apparatus body 11.

Figure 2:
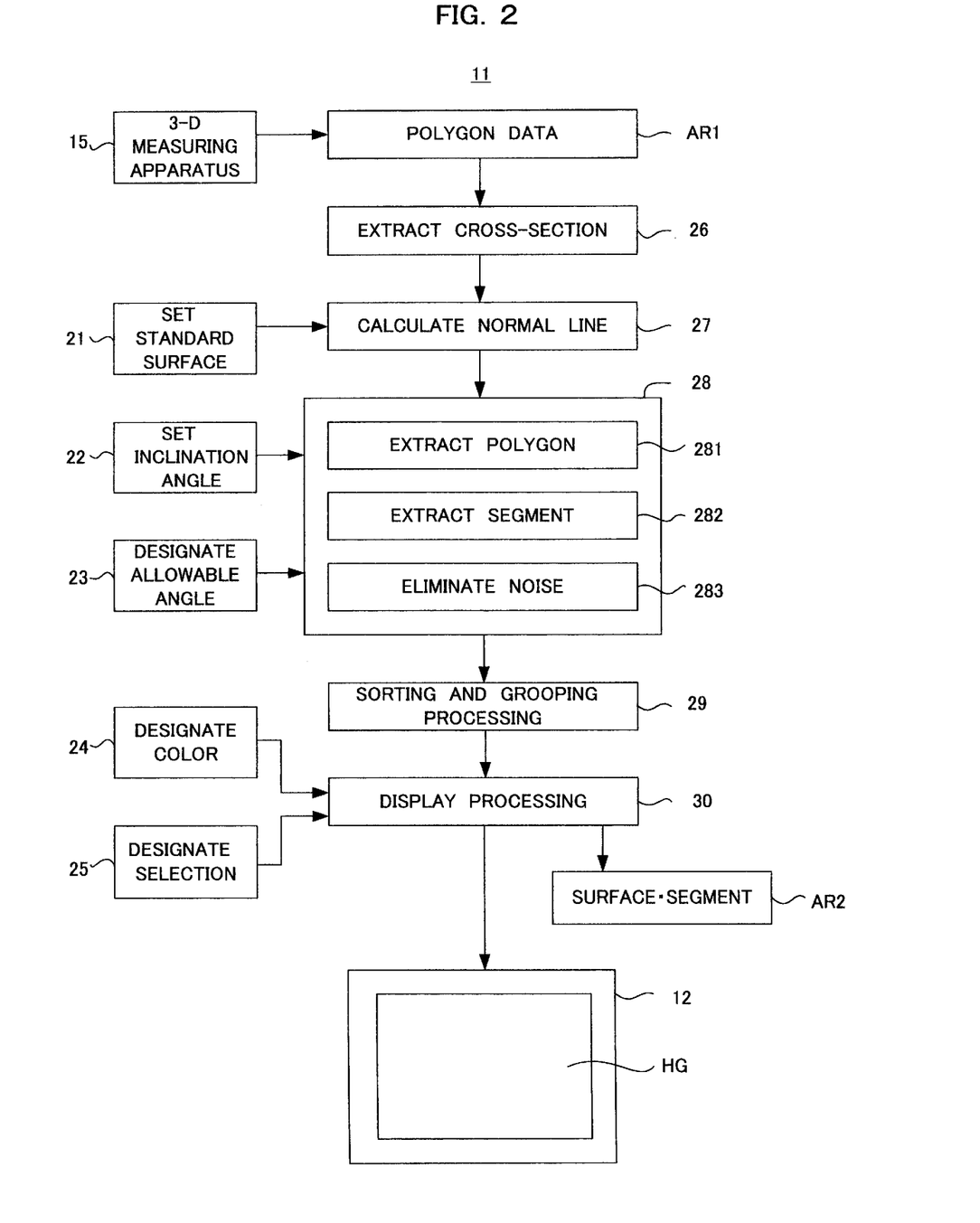
FIG. 2 is a block diagram showing functions to be realized by the apparatus.

FIG. 2 is a block diagram showing a function realized in the apparatus body 11.

Referring to FIG. 2, the apparatus body 11 comprises a standard surface setting portion 21, an inclination angle setting portion 22, an allowable angle designating portion 23, a color-designating portion 24, a selection designating portion 25, a cross-section extracting portion 26, a normal line calculating portion 27, an extracting portion 28, a sorting and grouping portion 29, a display processing portion 30, memorizing areas AR1 and AR2 and so on. As a matter of convenience, FIG. 2 separately shows each of the portions for each function of the apparatus body 11; however, each of the portions is not always independent of each other. Functions in the plural portions may be realized by a single element or software. Alternatively, a function in one of the portions may be realized in cooperation with the plural elements or the software. For example, a case in which each of the portions corresponds to each of steps carried out by using the software is included.

The memorizing areas AR1 and AR2 are predetermined areas provided in the RAM or the like of the apparatus body 11. The polygon data MR are memorized in the memorizing area AR1. The polygon data MR include, for example, coordinate data of each of vertexes of the polygons, data indicating front side or back side of each of surfaces of the polygons and so on. The front or back side of the surface is designated by, for example, order of the vertex coordinates. In turn, the memorizing area AR2 memorizes extracted surfaces T and lines S, generated three-dimensional shape data DT and sectional shape data DK and so on.

Figure 3:
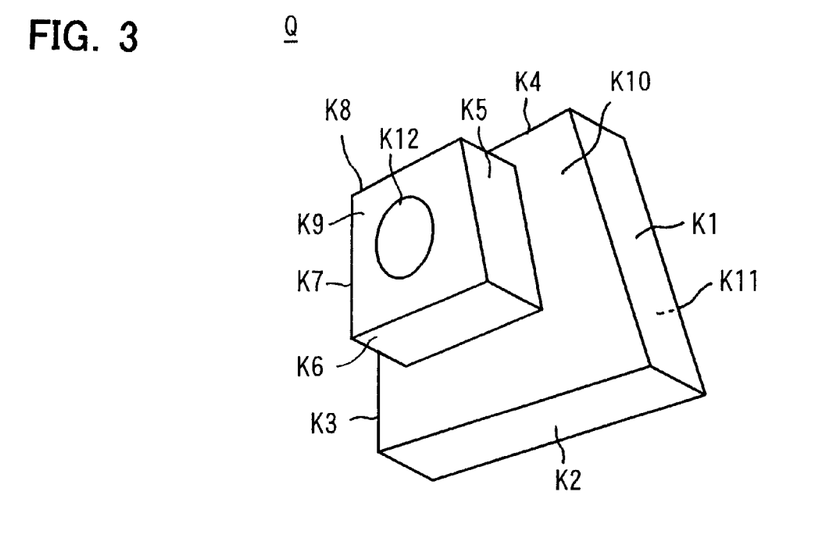
FIG. 3 is a perspective view showing an example of an object.
Figure 4:
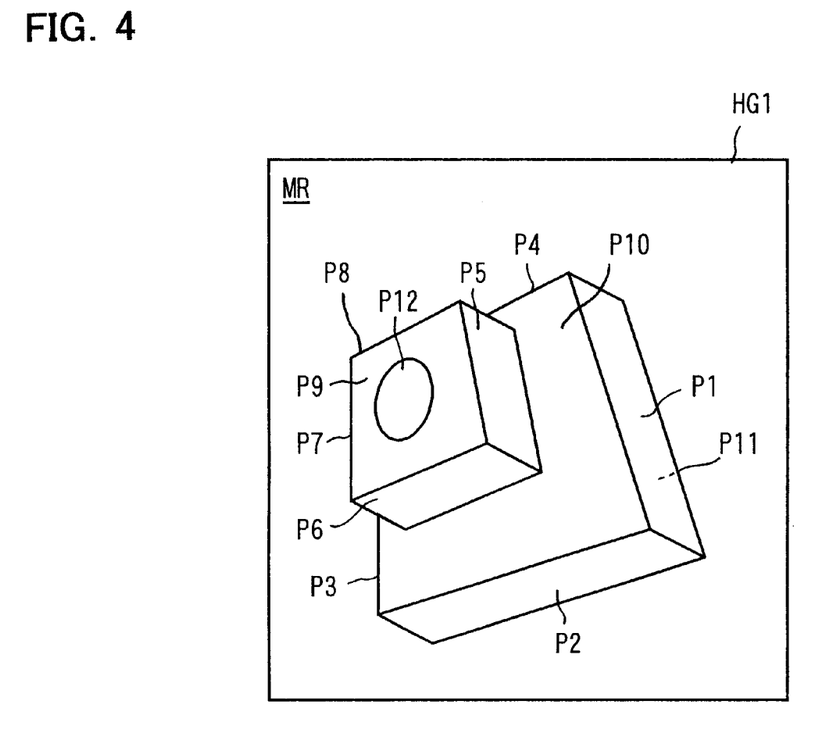
FIG. 4 shows polygon data of the object.

In the example shown in FIG. 4, an image HG1 based on the polygon data MR is displayed on a screen. The polygon data MR are obtained by measuring the object Q of FIG. 3 using the three-dimensional measurement device 15. The polygon data MR have surfaces (virtual surfaces) P1 to P12 comprising multiple polygons PG. The surfaces P1 to P12 respectively corresponds to outline surfaces K1 to K12 of the object Q.

Figure 9:
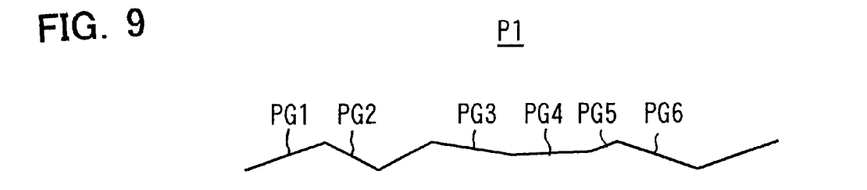
FIG. 9 is an example of a cross-section of a polygon.

As shown in FIG. 9, the surface P1 is composed of multiple polygons PG1, PG2, PG3 and so on. The polygons are different in angles from one another, i.e. directions of normal lines of the polygons are different from one another.

Figure 12:
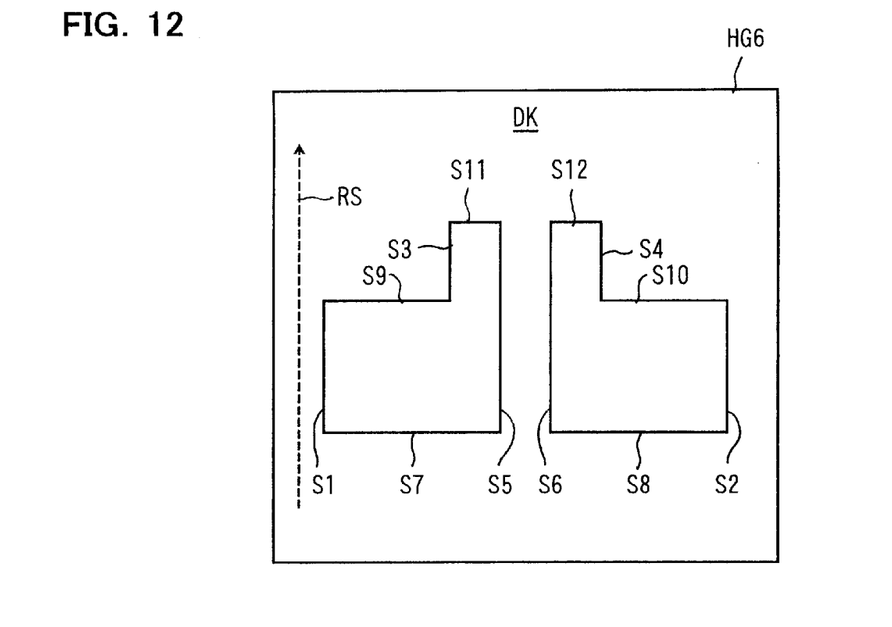
FIG. 12 shows an example of sectional shape data.

In the example shown in FIG. 12, an image HG6 of sectional shape data DK is displayed on a screen. The sectional shape data DK are prepared by cutting the polygon data MR shown in FIG. 4 along a horizontal plane crossing the center of the polygon data MR. The sectional shape data DK have lines (virtual lines) S1 to S12 comprising multiple segments SB.

Figure 14:
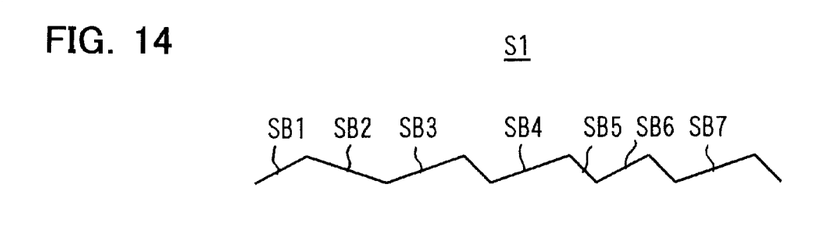
FIG. 14 is an example of segments composing a line.

As shown in FIG. 14, the line S1 is composed of the multiple segments SB1, SB2, SB3, etc. The segments are different in angles from one another, i.e. directions of the segments are different from one another.

The standard surface setting portion 21, the inclination angle setting portion 22, the allowable angle designating portion 23, the color designating portion 24 and the selection designating portion 25 each serves to set or designate relevant positions or values depending on contents of operation performed by the user using the keyboard 13 and the mouse 14.

The standard surface setting portion 21 sets a standard surface RM or a standard line RS with respect to polygon data MR in a space where the polygon data MR exist. Generally, a surface lying in parallel with any one of the surfaces P of the polygon data MR is set as the standard surface RM. Especially, a surface that is a standard for measurement is selected as the standard surface RM for the processing of or for the reproduction of the object Q. Generally, a ridgeline between surfaces P of the polygon data MR is set as the standard line RS. A centerline that passes through an opening of the object Q or the like may be set as the standard line.

The standard line RS may be set with respect to sectional shape data DK in a space where the sectional shape data DK exist.

Figure 5:
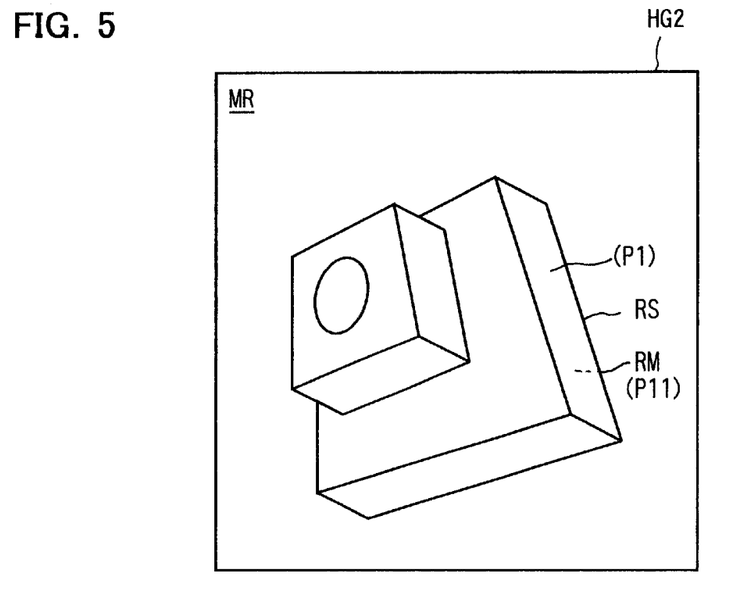
FIG. 5 shows examples of a standard surface and a standard line set in the polygon data.

In the example shown in FIG. 5, polygon data MR are displayed on the display as an image HG2, and the standard surface RM and the standard line RS are to be set on the image. A surface close to the surface P11, i.e. a bottom surface, is set as the standard surface RM. A line close to a ridgeline on boundary between the surface P11 and the surface P1 is set as the standard line RS.

In the example shown in FIG. 12, an image HG6 representing the sectional shape data DK is displayed, and the standard line RS is to be set on the image HG6. A line in parallel with the line S1 is set as the standard line RS.

For setting the standard surface RM and the standard line RS, known application programs or methods may be used. For example, a directional vector of the standard line RS is input by using the keyboard 13 in order to set the standard line RS. A normal line vector of the standard surface RM and a coordinate of a point on the standard surface RM are input by using the keyboard 13. Also, a surface comprised in a shape model may be selected as the standard surface RM.

The inclination angle setting portion 22 sets inclination angles θ made by polygons PG to be extracted and the normal line HS of the standard surface RM or the standard line RS. The inclination angles θ are selected from the range of 0 degree to 180 degrees (0 to π). In other words, a surface is not distinguished in terms of back side or front side and, therefore, surfaces that are in parallel to one another are extracted simultaneously irrespective of which side of each of the surfaces is used for setting the inclination angles θ. Accordingly, it is necessary to prepare data indicating back or front of a surface in order to distinguish the front side surface from the back side surface. The inclination angles θ may be set by, for example, inputting a value corresponding to each of the inclination angle θ using the keyboard 13.

The allowable angle designating portion 23 designates an allowable angle δ. The allowable angle δ indicates an allowable range ±δ with respect to the set inclination angles θ. The allowable angle δ is set in such a manner as 0.5 degree, 1 degree and 5 degree, for example.

The color designating portion 24 designates a color or a pattern when displaying an extracted surface T. For example, a color or a pattern of a surface T extracted correspondingly to one of the set inclination angles θ is assigned so that the color or the pattern is different from that of other surfaces T. Also, the color or the pattern is differed according to groups of extracted surfaces T.

The selection designating portion 25 designates a selection whether or not the extracted surface T is to be displayed. For example, the designation is performed with respect to each of the extracted surfaces T that are extracted correspondingly to one of the set inclination angles θ or with respect to each of the groups of the extracted surfaces T.

The cross-section extracting portion 26 calculates sectional shape data DK indicating a shape of a cross-section of an object Q based on polygon data MR. The sectional shape data DK are comprised by segments SB indicating an outline of the cross-section.

The normal line calculating portion 27 detects a normal line HS with respect to a standard surface RM or a polygon PG.

The extraction portion comprises a polygon extracting portion 281, a segment extracting portion 282 and a noise eliminating portion 283.

The polygon extracting portion 281 calculates angles α made by the normal line HS of the standard surface RM and the normal lines HS of the polygons PG. The polygon extracting portion 281 judges whether or not each of the calculated angles α is in the allowable angle range ±δ of the set inclination angles θ to extract polygons in an inclination angle range θ±δ.

Figure 10:
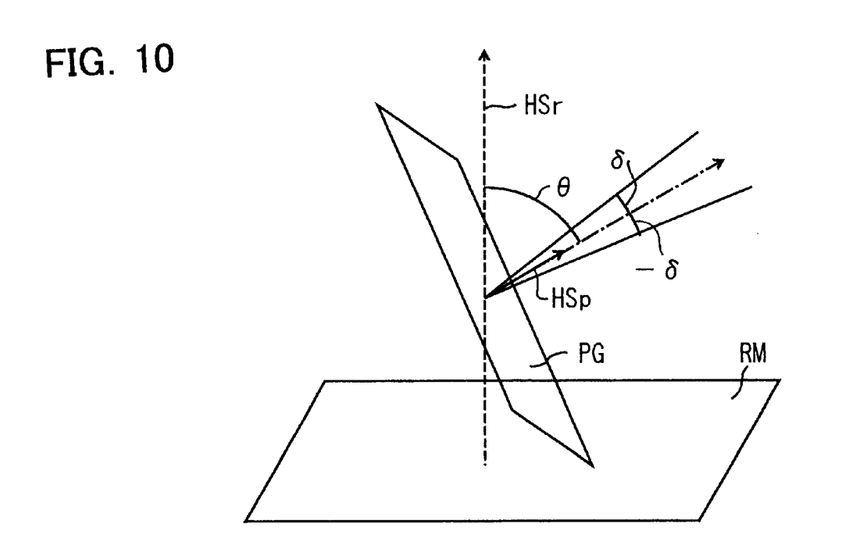
FIG. 10 shows relationship between a standard surface and a surface to be extracted.

As shown in FIG. 10, the polygon PG is extracted when the angle made by the normal line HSRr of the standard surface RM and the normal line HSp of the polygon PG is in the inclination angle range θ±δ.

With respect to sectional shape data DK calculated by the cross-section extracting portion 26, the segment extracting portion 282 calculates angles α made by segments SB comprised in the sectional shape data DK and the normal line HS of the standard surface RM or the standard line RS. The segments extracting portion 282 then judges whether or not each of the calculated angles α is in the inclination angle range θ±δ to extract segments SB in the allowable range.

The noise eliminating portion 283 eliminates a polygon PG or a segment SB that does not consecutive, or isolate, from the extracted polygons PG or segments SB as noise. Algorithm for eliminating the noise is as follows, for example.

In the case where two or more polygons PG are consecutive in the extracted polygons PG, such polygons PG are extracted as normal polygons PG. Also, polygon data MR are divided into areas each having a predetermined size, and it is judged whether or not a percentage of the extracted polygons PG present in the predetermined area are higher than a predetermined percentage. In the case where the extracted polygons PG are present in a percentage higher than the predetermined percentage in the predetermined area, a surface composed of the polygons PG is extracted as a normal surface T. For example, an area wherein a predetermined number of polygons PG exist is designated as the predetermined area. In this case, size of the area may be changed by arbitrarily changing the predetermined number.

In turn, in the case where two or more segments SB are consecutive, such segments SB are set as normal segments SB. Also, sectional shape data are divided into areas each having a predetermined size, and it is judged whether or not a percentage of the extracted segments SB present in the predetermined area is higher than a predetermined percentage. In the case where the extracted segments SB are present in a percentage higher than the predetermined percentage in the predetermined area, the segments SB are extracted as a normal segment U. For example, an area wherein a predetermined number of segments SB exist is designated as the predetermined area. In this case, size of the area may be changed by arbitrarily changing the predetermined number.

The sorting and grouping portion 29 performs sorting by setting a polygon PG or polygons PG extracted correspondingly to one of the set inclination angles θ as belonging to an identical group. The sorting may be performed by, for example, setting neighboring or consecutive polygons PG as a group and non-consecutive polygons PG as another group.

Also, the sorting may be performed in such a manner by dividing an extracted surface T into predetermined areas, and setting extracted polygons PG as a group when the extracted polygons PG are contained in one of the predetermined areas of the extracted surface T in a predetermined percentage and values of intercepts of the polygons PG are in a predetermined range. Here, the intercept is represented by d in the following equation:

$a \cdot xo + b \cdot yo + c \cdot zo = d$, provided that $a(x-xo) + b(y-yo) + c(z-zo) = 0$.

The sorting and grouping portion 29 sorts the segments SB extracted by the extracting portion 28 by directions. More specifically, the segments SB extracted correspondingly to one of the set inclination angles θ are set as a group.

The display processing portion 30 displays the extracted surfaces T. In this case, each of the surfaces T is displayed as being put a color or a pattern designated by the color designating portion 24. The display processing portion 30 displays only the surfaces T designated by the selection designating portion 25.

Figure 6:
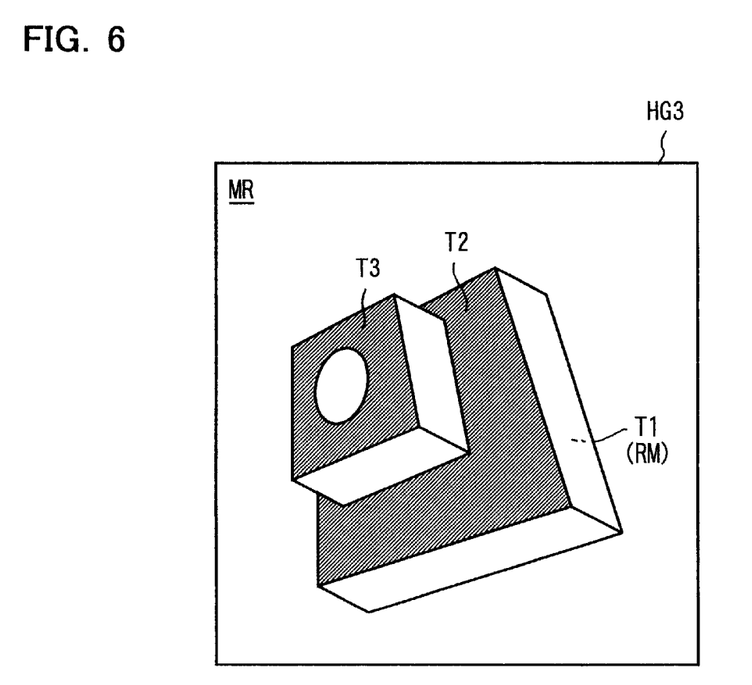
FIG. 6 shows an extracted surface on which is put a color.

The surfaces T1 to T3 shown in FIG. 6 are extracted by setting an inclination angle θ as 0 degree (i.e. in parallel) with respect to the standard surface RM shown in FIG. 5. The surfaces T1 to T3 are parallel to the standard surface RM and the surface T1 is reverse to the surfaces T2 and T3.

In this case, the surfaces T1 to T3 are displayed with being put an identical color such as blue, in the image HG3. If it is set that colors of back side and front side are displayed by different colors, T1 is put a color different from that of T2 and T3 (T2 and T3 are put the same color). Further, if it is set that groups are displayed by different colors, different colors are put to the surfaces T1 to T3.

Figure 7:
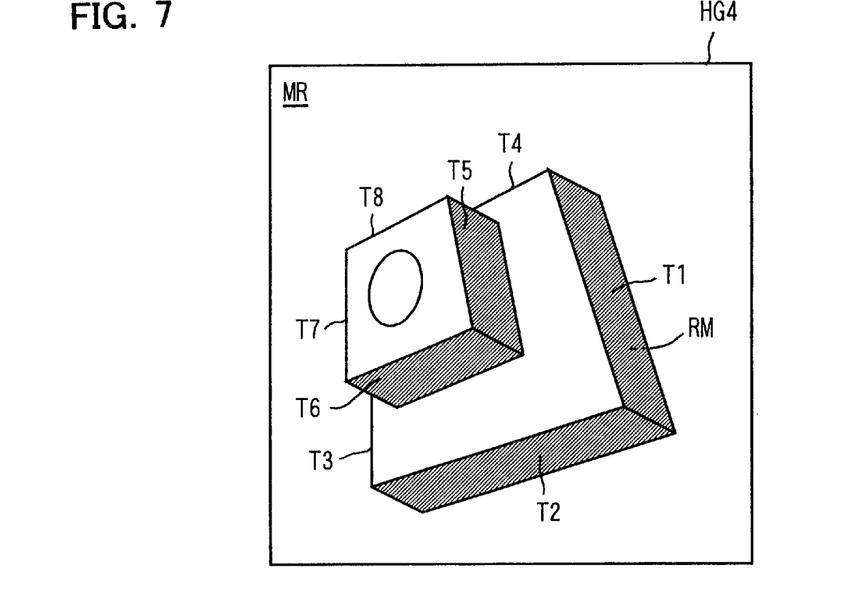
FIG. 7 shows extracted surfaces sorted into groups on which are put different colors.

The surfaces T1 to T8 shown in FIG. 7 are extracted when the inclination angle θ is set as 90 degrees (i.e. perpendicular) with respect to the standard surface RM shown in FIG. 5. The surfaces T1 to T8 are perpendicular to the standard surface RM.

In this case, the surfaces T1 to T8 are shown by an identical color such as green in the image HG4. If it is set that colors of groups are different to each other, different colors are put to the surfaces T1 to T8.

It is possible to display the surfaces T1 to T3 shown in FIG. 6 and the surfaces T1 to T8 shown in FIG. 7 with putting colors simultaneously to them. In this case, it is also possible to assign an arbitrary surface T to be displayed or not to be displayed by using the color designating portion 24 or the selection designating portion 25.

Thus, a user can easily understand a condition and a shape of the object Q by displaying extracted surfaces T with putting them various colors or patterns.

In the polygon data MR shown in FIG. 6 or 7, one of the extracted surfaces T is designated so that distances between the standard surface RM and the designated surfaces T or distances between each of the designated surfaces T are automatically calculated. The calculated distances are displayed as sizes of parts of the object Q as the image HG5 shown FIG. 8.

Figure 8:
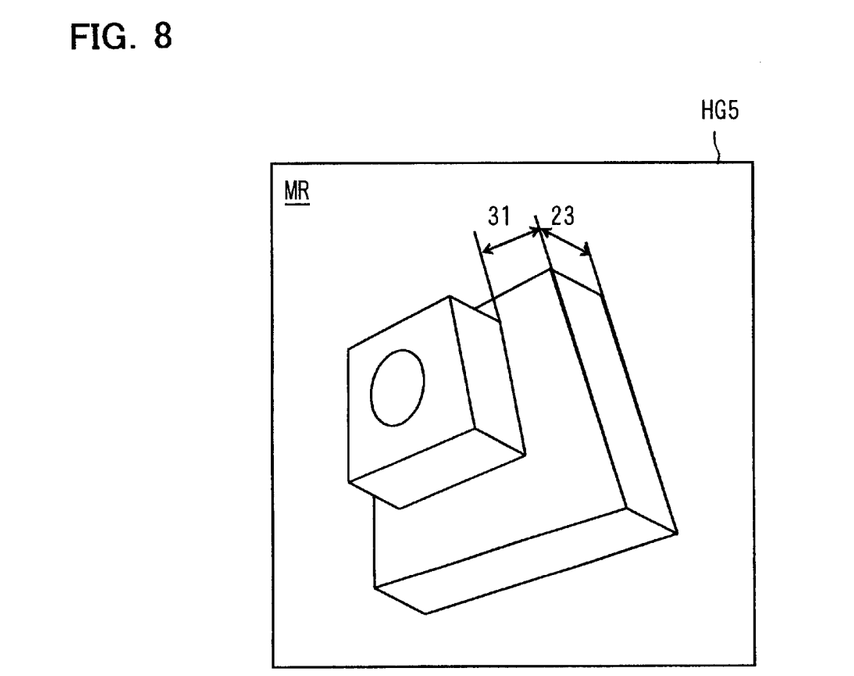
FIG. 8 shows surfaces displayed together with their sizes.

In this case, it is possible to display only a distance of a normal surface by pointing the normal surface T by using the mouse 14.

Figure 13:
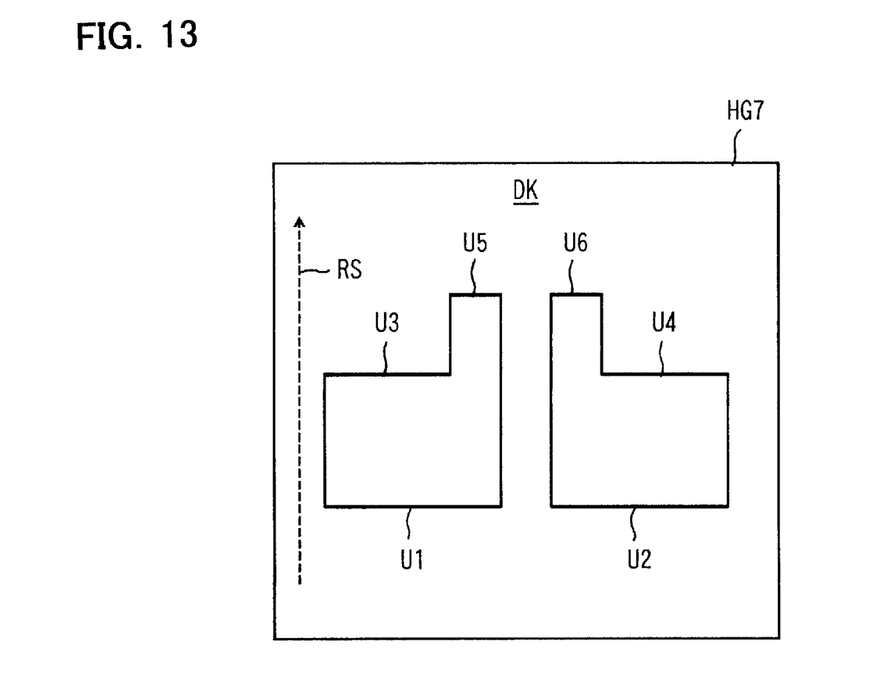
FIG. 13 shows an example of a segment extracted from the sectional shape data.

In the example shown in FIG. 13, the lines U1 to U6 extracted when the inclination angle θ is set to be 90 degrees (i.e. perpendicular) with respect to the standard line RS are displayed.

In this case, the extracted lines U1 to U6 are displayed by the same color in the image HG7, and other lines are displayed in a different color. If it is set that groups are different in color, the lines U1 to U6 are displayed by different colors.

Figure 11:
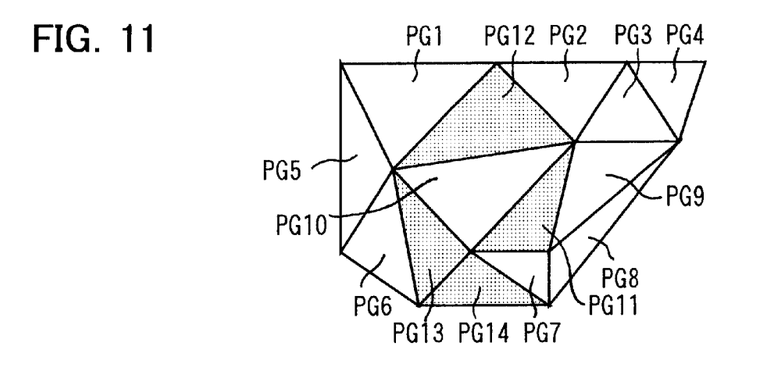
FIG. 11 illustrates a method of eliminating noise.

In FIG. 11, the white polygon PG1 to PG10 are the extracted surfaces T, and the black polygons PG11 to PG14 are the non-extracted surfaces. The extracted polygon PG10 is surrounded by the polygons PG11 to PG13 each of which is not extracted. In this case, the non-consecutive polygon PG10 is eliminated as noise, and the consecutive polygons PG1 to pg9 are regarded as normal polygons PG (surface T).

As described above, it is judged whether or not the extracted surface is noise, and the surfaces T judged to be noises are eliminated.

Figure 15:
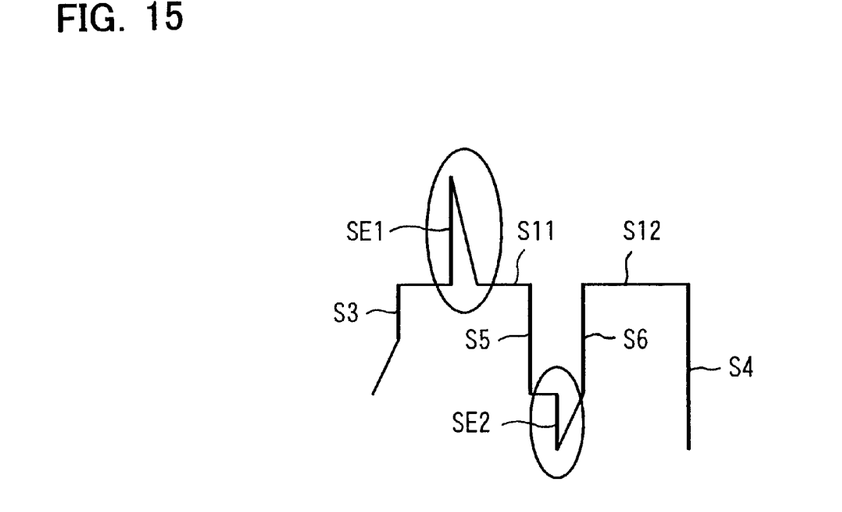
FIG. 15 illustrates a method of eliminating noise.

Further, in the case of the sectional shape data DK, the segment S in a circle, SE1 and SE2 are eliminated as noise since they are non-consecutive as shown in FIG. 15.

A flow of processing carried out by the data processing apparatus 1 will be described below with reference to the flowchart shown in FIG. 16.

Figure 16:
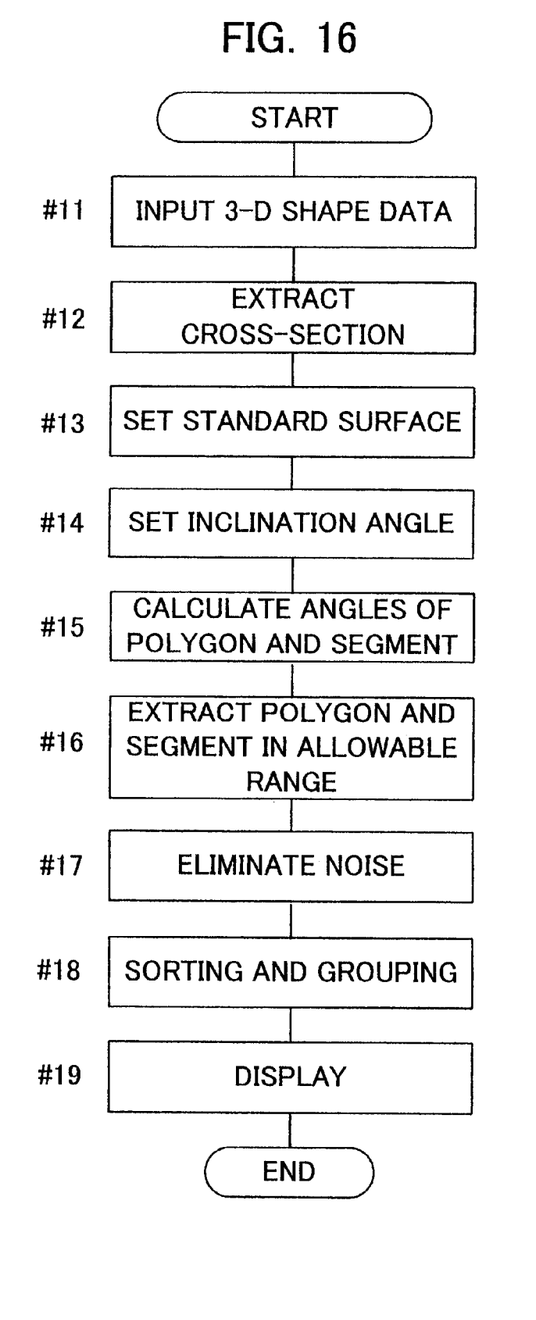
FIG. 16 is a flow chart showing a flow of processing carried out by the data processing apparatus.

In FIG. 16, three-dimensional shape data DT are input to be memorized in a memory area AR1 (#11). Sectional shape data DK are generated as required (#12). A standard surface RM and a standard line RS are set (#13). An inclination angle θ and an allowable angle δ are set or assigned (#14).

Then, angles of polygons PG or of segments SB with respect to the standard surface RM or the standard line RS are calculated (#15). There are extracted polygons PG and segments SB that are in an inclination angle range θ±δ from the polygons PG and segments SB (#16). Noise is eliminated from the extracted polygons PG and segments SB (#17).

The extracted polygons PG and segments SB are sorted into groups when so required (#18). The polygons PG and the segments SB are displayed with being designated colors or patters (#19). The polygons PG and the segments SB are printed out when so required. The extracted polygons PG, the extracted segments SB, the generated three-dimensional shape data DT, sectional shape data DK and the like are memorized in the recording area AR2 to be stored. The stored date are memorized in the recording media MA1 and MA2 and taken out therefrom as required, and transferred to an external device via an appropriate interface or to another computer via a network such as the Internet.

Thus, it is possible to easily extract surfaces or lines structuring an outline of an object Q from three-dimensional shape data DT or sectional shape data DK of the object Q.

Further, visibility of the three-dimensional shape data DT is improved by displaying with putting a color or pattern to each of the extracted surfaces or displaying the extracted surfaces by sorting them into groups and putting different colors or patters to the groups. Thus, understanding of the object Q is remarkably facilitated.

Moreover, the object Q can be easily examined by calculating sizes between surfaces or between a surface and a line and displaying them. It is possible to automate the examination of the object Q by comparing the calculated sizes with design values.

It is possible to examine the object with confirming a structure of an arbitrary cross-section of the object Q by displaying the sectional shape data DK or by displaying the lines or sizes extracted by using the sectional shape data DK.

In the embodiments described above, it is possible to use a laptop-type personal computer, a desk top-type personal computer, a note-type personal computer, a palm top-type personal computer or other various types of personal computers or workstation as the data processing apparatus. Further, it is possible to modify whole or part of the data processing apparatus, processing contents, processing order, contents of images to be displayed, display method and the like according to the spirit and scope of the present invention. The present invention may be used for various objects including goods, assembly parts, living creatures and so on.

What is claimed is:

1. A method for extracting a surface from three-dimensional shape data, comprising:

setting a standard surface or a standard line with respect to three-dimensional shape data comprising polygons representing an object in a space where the three-dimensional shape data exist;

extracting, from the three-dimensional shape data, polygons each having an inclination angle in a predetermined range with respect to the set standard surface or the set standard line; and setting a collection of the extracted polygons as an extracted surface.

2. A method for extracting a surface from three-dimensional shape data comprising:

setting a standard surface or a standard line with respect to three-dimensional shape data comprising polygons representing an object in a space where the three-dimensional shape data exist;

setting inclination angles of the polygons with respect to the set standard surface or the set standard line;

designating an allowable range in the set inclination angles;

calculating angles made by the polygons and the standard surface or the standard line; and extracting a polygon of which the calculated angle is in the allowable range of the inclination angles.

3. An apparatus for extracting a surface from three-dimensional shape data comprising:

a setting portion for setting a standard surface or a standard line with respect to three-dimensional shape data comprising polygons representing an object in a space where the three-dimensional shape data exist;

an angle setting portion for setting inclination angles of the polygons with respect the set standard surface or the set standard line;

a designating portion for designating an allowable range in the set inclination angles;

a calculating portion for calculating angles made by the polygons and the standard surface or the standard line; and an extracting portion for extracting a polygon of which the calculated angle is in the allowable range of the inclination angles.

4. An apparatus for extracting a surface from three-dimensional shape data comprising:

a setting portion for setting a standard surface or a standard line with respect to three-dimensional shape data comprising polygons representing an object in a space where the three-dimensional shape data exist;

a standard element calculating portion for setting a standard element that is a surface or a line having a specific relationship with the set standard surface or the polygons;

an angle setting portion for setting inclination angles of the polygons with respect to the set standard surface or the set standard line;

a designating portion for designating an allowable range in the set inclination angles;

a calculating portion for calculating angles made by the polygons and the standard surface or the standard line; and an extracting portion for extracting a polygon of which the calculated angle is in the allowable range of the inclination angle.

5. The apparatus for extracting a surface from three-dimensional data according to claim 4, comprising a noise eliminating portion for extracting a surface as a normal surface only when the surface is composed of the extracted polygons wherein two or more polygons are consecutive or of the extracted polygons that are present in a predetermined area in a percentage higher than a predetermined percentage.

6. The apparatus for extracting a surface from three-dimensional data according to claim 4, comprising:

a cross-section extracting portion for calculating, based on the three-dimensional shape data, sectional shape data comprising a collection of segments and indicating a sectional shape of the object;

a calculating portion for calculating angles made by each of the collection of segments and the standard element of the standard surface or the standard line; and an extracting portion for extracting a segment whose angle obtained by the calculation is in the allowable range of the set inclination angles.

7. The apparatus for extracting a surface from three-dimensional shape data according to claim 4, wherein the standard element is a normal line.

8. The apparatus for extracting a surface from three-dimensional shape data according to claim 4, comprising a display processing portion for displaying each collection of extracted polygons on a display as a surface and displaying a collection of polygons extracted correspondingly to one of the inclination angles with putting thereto a color or a pattern that is different from colors or patterns of other collections of polygons.

9. The apparatus for extracting a surface from three-dimensional shape data according to claim 4, comprising a sorting and grouping portion for sorting the polygons extracted correspondingly to the inclination angles into groups depending on the inclination angles.

10. The apparatus for extracting a surface from three-dimensional shape data according to claim 4, comprising a display processing portion for displaying each collection of extracted polygons on a display as a surface and for displaying surfaces that are in parallel to each other such that a first surface is displayed with a color or a pattern that is different from a color or a pattern of of a second surface.

11. The apparatus for extracting a surface from three-dimensional shape data according to claim 4, comprising a calculating portion for calculating a distance between a surface comprising the collection of extracted polygons and the standard surface.

12. An apparatus for processing three-dimensional shape data comprising:

a calculating portion for calculating, based on three-dimensional shape data comprising polygons representing an object, sectional shape data comprising a collection of segments and indicating a sectional shape of the object;

a setting portion for setting a standard surface or a standard line in a space wherein the three-dimensional shape data exist;

a standard element calculating portion for determining a standard element that is a surface or a line having a specific positional relationship with the set standard surface;

an angle setting portion for setting inclination angles of polygons with respect to the standard element of the standard surface or the standard line;

a designating portion for designating an allowable range in the set inclination angles;

a calculation portion for calculating angles made by the segments and the standard element of the standard surface or the standard line; and an extracting portion for extracting a segment whose angle obtained by the calculation is in the allowable range of inclination angles.

13. A computer-readable recording medium wherein a program is recorded, the program letting a computer perform the processing of:

setting a standard surface or a standard line with respect to three-dimensional shape data comprising polygons representing an object in a space wherein the three-dimensional shape data exist;

extracting from the three-dimensional shape data polygons whose inclination angles with respect to the set standard surface or the set standard line are in a predetermined range; and setting a collection of the extracted polygons as a surface.

14. A computer-readable recording medium wherein a program is recorded, the program letting a computer perform the processing of:

setting a standard surface or a standard line with respect to three-dimensional shape data comprising polygons representing an object in a space wherein the three-dimensional shape data exist;

determining a standard element that is a surface or a line having a specific positional relationship with the set standard surface or the polygons;

setting inclination angles of polygons with respect to the standard element of the set standard surface or the set standard line;

designating an allowable range in the set inclination angles;

calculating angles made by the polygons and the standard surface or the standard line;

extracting a polygon of which the calculated angle is in the allowable range of the inclination angles; and displaying a collection of the extracted polygons as a surface.

* * * * *